Patented Dec. 13, 1938

2,140,052

UNITED STATES PATENT OFFICE 2,140,052

FUROIC ACID ESTERS OF AROMATIC ORTHOHYDROXY CARBOXYLIC ACIDS

William Hiemenz and Louis Freedman, Albany, N. Y., assignors, by mesne assignments, to The Bayer Company, Inc., New York, N. Y., a corporation of New York No Drawing. Application May 29, 1936, Serial No. 82,522

2 Claims. (Cl. 260—345)

This invention relates to derivatives of aromatic ortho-hydroxy carboxylic acids.

The new derivatives of our invention may be described as being esters of a carboxylic acid of the furane series and an ortho-hydroxy carboxylic acid of the benzene series. More particularly, we contemplate the furoic acid esters of the benzene ortho-hydroxy carboxylic acids of the general formula:

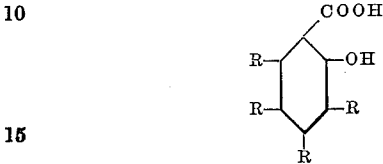

in which R represents a member of the group consisting of hydrogen and methyl.

In order to produce a derivative of the kind specified, we react, for example, alpha-furoic acid chloride with an ortho-hydroxy carboxylic acid of the benzene series, for instance, upon salicylic acid. The reaction may be carried out, for example, in organic solvents and in the presence of a suitable base to bind hydrochloric acid. However, we may use any other method commonly employed for the preparation of esters. Instead of salicylic acid we may also employ the cresotinic acids which are higher homologues of salicylic acid and possess a methyl group in any of the free positions of the benzene nucleus.

The new products according to our invention can be obtained in the form of colorless crystals which are difficultly soluble in water, but soluble in organic media, such as, for instance, methyl alcohol, benzene, and ethyl ether. The products have an excellent analgesic and antipyretic effect and may be used, therefore, for various pharmaceutical purposes.

The following example will further illustrate the nature of this invention, but the invention is not restricted thereto; all parts are by weight:

Example 41.5 parts salicylic acid are dissolved in 300 parts of benzene in a three-way flask connected with stirrer, reflux condenser and dropping funnel. 72 parts dimethyl aniline are added and 40 parts of furoyl chloride are dropped in and the mixture stirred frequently while cooling slightly. After final addition of the chloride, the mixture is stirred at room temperature or at a temperature not over 40° C., for 3 to 4 hours. The reaction mixture, cooled to room temperature, is poured into a mixture of ice and 75 parts of concentrated hydrochloric acid. The benzene layer is separated, washed several times with dilute hydrochloric acid solution to remove all dimethyl aniline and finally with water to remove all acid. The benzene solution is dried over anhydrous sodium sulphate and distilled to small volume, from which the furoyl salicylate crystallizes out in the form of colorless prisms. The product has the following formula:

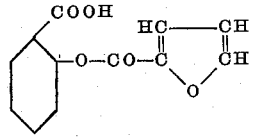

It is purified by recrystallization from benzene or 60% methyl alcohol. It forms colorless prisms melting at 131 to 132° C. It is difficultly soluble in water and is soluble in ethyl alcohol, methyl alcohol, benzene and ether.

We claim:

1. The ester of a benzene ortho-hydroxy carboxylic acid of the general formula:

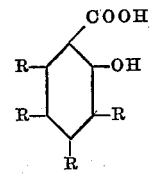

in which one R represents a member of the group consisting of methyl and hydrogen and the other R's represent hydrogen, and alpha-furoic acid.

2. The alpha-furoic acid ester of salicylic acid having the formula:

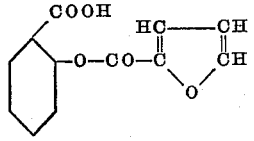

and being a colorless crystalline compound melting at from 131 to 132° C.

WILLIAM HIEMENZ.
LOUIS FREEDMAN.